United States Patent

[11] 3,565,208

[72] Inventors: Victor Millman;
Remo Tontini, San Diego, Calif.
[21] Appl. No. 7,772
[22] Filed Feb. 2, 1970
[45] Patented Feb. 23, 1971
[73] Assignee Rohr Corporation
Chula Vista, Calif.

[54] RETRACTABLE SILENCING SHIELD FOR JET ENGINE NOZZLE
4 Claims, 2 Drawing Figs.

[52] U.S. Cl. .................................................. 181/33,
239/265.13, 239/265.19
[51] Int. Cl. .................................................. F01n 1/00,
B64d 33/06
[50] Field of Search .................................................. 181/51, 35,
33.22, 33.221, 33.222, 33.223, 33, 33.05;
239/265.13, 265.19, 265.33

[56] References Cited
UNITED STATES PATENTS
3,027,710 4/1962 Maytner .................. 181/33(.221)
3,174,282 3/1965 Harrison .................. 181/33(.222)

FOREIGN PATENTS
1,019,857 2/1966 Great Britain ............... 239/265.33
1,436,412 3/1966 France ...................... 181/33(.221)

Primary Examiner—Robert S. Ward, Jr.
Attorney—George E. Pearson

ABSTRACT: Support means carried by an aircraft jet engine housing has pivots at its aft end and is slidable axially of the housing between forward stowed position and aft deployed position, said pivots being located adjacent exit of engine nozzle in latter position. Elongate shield is mounted on the pivots to swing vertically about an axis transverse to longitudinal axis of housing, and is preferably trough-shaped to surround jet-stream discharged from the nozzle and reflect noise upward. Aft end of shield is supported or forced up in flight by aerodynamic reacting vanes mounted on inner side of said aft end. When support means is stowed, shield is carried forward to stow in streamlined relation to housing.

PATENTED FEB 23 1971

3,565,208

INVENTOR.
VICTOR MILLMAN
REMO TONTINI

BY Edwin D. Grant
ATTORNEY

RETRACTABLE SILENCING SHIELD FOR JET ENGINE NOZZLE

SUMMARY OF THE INVENTION

This invention pertains to sound suppression of aircraft jet engines, which produce reaction thrust by ejecting a high velocity stream of gas from the exhaust nozzle of a gas turbine. The exhaust streams of such engines create noise in a wide range of frequencies, and during the flight of a jet airplane at low altitude, such as during takeoff and climb, a portion of this noise reaches the ground at an energy level which is unacceptable to the public.

The invention disclosed herein provides a system in which that portion of the noise of a jet engine exhaust stream which produces objectionable effects at ground level is largely prevented from traveling downward while no control is exercised over the portion of said noise which radiates upwardly. Various schemes have been heretofore proposed which make use of sound reflection to suppress noise of a jet engine exhaust stream to some extent, but they are generally inadequate because their design permits the reflection of only a small portion of the objectionable noise. The present invention provides a very satisfactory solution to the aforesaid noise problem, and can be employed by adding to an aircraft a limited amount of equipment which requires very little maintenance for continued optimum service. Briefly described, sound suppression apparatus in accordance with the invention comprises support and guide tracks carried by a jet engine housing, support means movable axially on the tracks and having pivots at the aft end thereof, an elongate noise reflector and suppressor shield the forward end of which is connected to said pivots so that the shield can swing vertically about an axis disposed generally horizontal and transverse to the longitudinal axis of the nozzle of the engine within the housing, and vanes mounted on the aft end of the shield and disposed within the exhaust gas stream discharged from the nozzle when the shield is in a deployed position extending rearwardly from the housing. When the support means is located in a forward position on the tracks the shield fits around the housing in streamlined relation therewith, and when the support means is moved to the aft ends of the tracks the shield trails downstream from the housing as aforesaid. The shield is upwardly concave and wide enough to surround the lower portion of the exit of the thrust nozzle of the engine enclosed within the housing.

The vanes may be preset for each installation thereof after several test flights of an aircraft have been made to determine the proper setting which lifts the shield to the angle with respect to the nozzle axis at which optimum sound suppression is obtained. Alternatively the vanes, or portions thereof, may be movable about horizontal axes disposed perpendicular to the longitudinal axis of the nozzle. A sensor may be carried by the shield to sense the optimum operating condition when the jetstream attaches to the shield, with a known type of control device being actuated by signals from the sensor to operate the vanes.

Stop means are provided to limit the drop or angular departure of the shield from the jetstream axis, the lowest position which the shield may take being less than the optimum but sufficient to produce significant noise suppression.

It has been determined that sound waves are emitted substantially radially outward from the cone of noise produced by a jetstream so that only the lower half of said cone produces the objectionable ground-directed noise. Since the shield encompasses the lower half, approximately, of the jetstream immediately downstream from the nozzle exit where the noise is initiated, and the stream is forced to flow along the length of the shield, the objectionable sound waves are reflected upwardly from the shield while it is not necessary to control those which are originally directed upwardly. An important advantage of a shield in accordance with the invention is that if functions very well with simple nozzles or with those which are provided with other sound suppressing devices.

The present invention comprises an improvement over the invention disclosed and claimed in the application of Millman et al. U.S. Pat. application Ser. No. 847,069 filed on Aug. 4, 1969 and assigned to Rohr Corporation, the assignee of this application.

DETAILED DESCRIPTION

Figure 1:
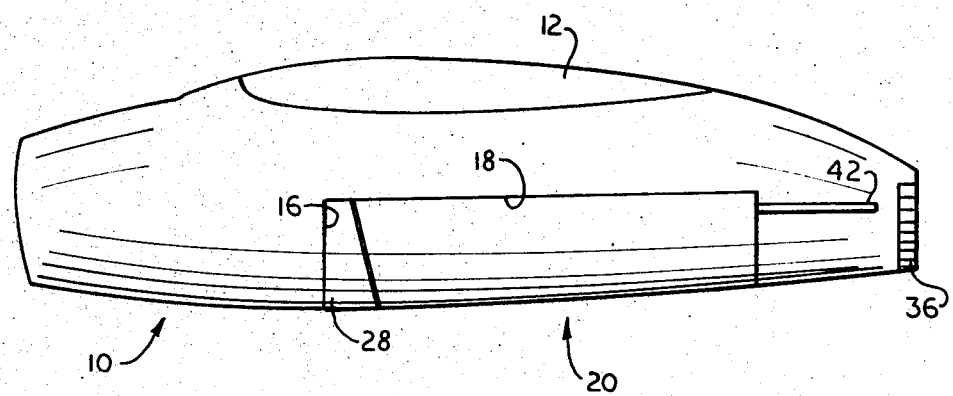
FIG. 1 is a side elevation of an aircraft engine nacelle, or housing, provided with a sound suppressing shield in accordance with this invention, the drawing illustrating the stowed position of the shield.

In FIG. 1 reference number 10 designates generally a tubular housing which is mounted on an aircraft wing 12 and depends therefrom. A jet engine (not shown) is enclosed within housing 10 and provided with a thrust nozzle 14 (see FIG. 2) which may terminate substantially at the plane including the aft end of the housing, although this is not essential. A generally hemicylindrical opening is formed in the lower part of the part of the housing and comprises a circumferentially extending edge 16 and longitudinally extending edges 18 respectively disposed on opposite sides of the housing, the forward and side edges of a trough-shaped shield (designated generally by reference number 20) respectively abutting said edges 16 and 18 when the shield is in the stowed position thereof which is illustrated in FIG. 1. As described in detail in the aforementioned prior patent application of Millman et al., shield 20 is pivotally mounted on a pair of support beams 22A, 22B (see FIG. 2) which in turn are mounted for movement axially along longitudinally grooved tracks (not shown) respectively fixedly secured to opposite sides of housing 10 and extending longitudinally thereof. More particularly, a pivot 24 is located at the aft end of each support beam and the forward portion of each longitudinal edge 26 of the shield is pivotally connected to a respective one of these pivots so that the shield can swing about a horizontal axis disposed perpendicular to the longitudinal axis of nozzle 14 and substantially at the level thereof. The ends of a hemicylindrical, upwardly, concave plate 28 are respectively fixedly attached to the aft ends of support beams 22A, 22B, said plate serving the dual purpose of uniting said beams and acting as a stop which limits the extent of rotation of shield 20 about pivots 24 in the downward direction. A flexible liner 30 may be secured to the inner wall of plate 28 so as to extend into the forward end of the shield, thus closing the gap between said plate and said shield when the latter swings upwardly. Details of the manner in which beams 22A, 22B are mounted on the aforesaid tracks which extend longitudinally of housing 10 are described and illustrated in the prior Millman et al. application, to which the reader is referred for further particulars. As mentioned in said application, any suitable means may be provided for moving the support beams between a position at the forward ends of said tracks and the position at the aft ends thereof which illustrated in FIG. 2, such means including, for example, pulleys, a supply and takeup reel, and cables attached to the reel and passing in reverse fashion over the pulleys and attached to anchorages on the beams. In this connection, attention is directed to two rollers 32 (only one of which is illustrated, in FIG. 2) which are respectively mounted on opposite sides of the inner surface of shield 20 adjacent the longitudinal edges 26 thereof. As stated in the prior Millman et al. application, when the shield is being returned from the deployed position to the stowed position, each roller 32 enters the aft end of the groove in a respective one of the aforesaid tracks which support beams 22A, 22B, this entrance of the roller being facilitated by a flared aft end portion of the groove in each track which accommodates vertical misalignment of the rollers with the tracks. Rollers 32 support the aft end of shield 20 when the latter is stowed around housing 10 during cruise flight of the associated aircraft. It will be noted that when the support beams 22A, 22B are fully deployed their aft ends extend a short distance beyond the aft end 34 of housing 20 and the forward end of shield 20 is substantially coplanar with the latter. If desired, a series of overlapping vanes 36 may also be pivotally mounted at the aft end of the housing and connected with suitable means for swinging the same outward into contact with the inner surface of liner 30 to thereby close the gap between the liner and the outer wall of the housing (or if a liner is not used, to contact the inner surface of plate 28).

When shield 20 is deployed its angular disposition relative to the longitudinal axis of the stream of exhaust gas discharged from nozzle 14 (the flow of which is represented by an arrow in FIG. 2) is controlled by means of two vanes 38A, 38B which are pivotally mounted on the inner side of said shield adjacent the aft end and the longitudinal edges 26 thereof. More particularly, the vanes are mounted for rotation about a common axis which is disposed perpendicular to the longitudinal axis of the shield, and in their simplest form are presettable on the ground to attitudes determined by prior experiment to be appropriate for supporting the shield in optimum angular relation with the jet stream when the latter is flowing by said vanes and exerting lifting force thereon. Alternatively, the attitude of the vanes may be controlled by means of sensing apparatus of the type illustrated in FIG. 3 of the drawings in the noted Millman et al. application.

Figure 2:
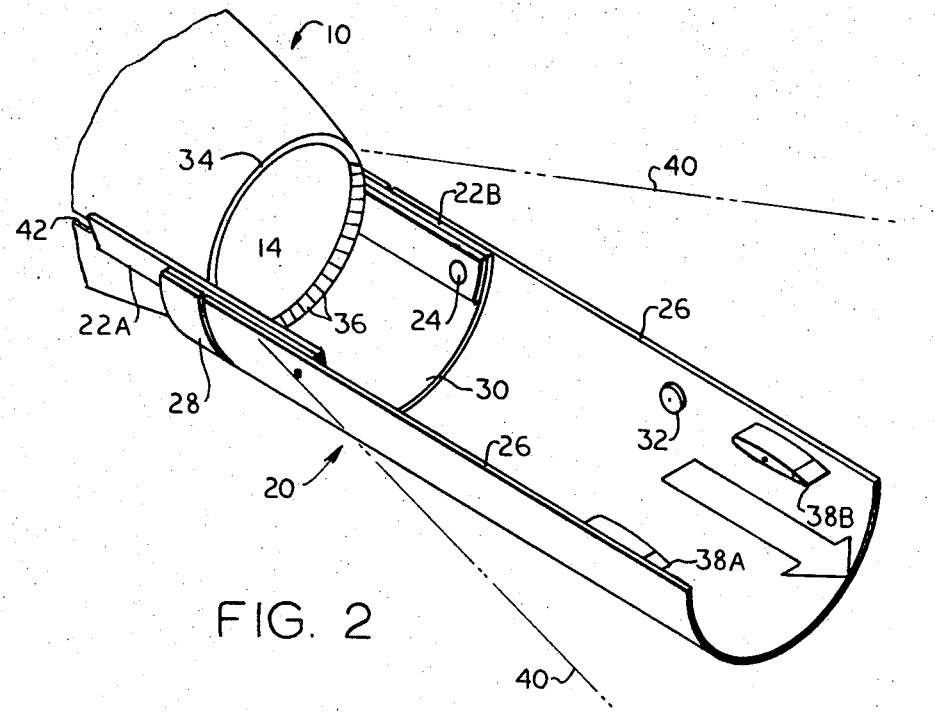
FIG. 2 is a fragmentary pictorial view of the same housing, illustrating the deployed position of the aforesaid shield.

In FIG. 2 the broken lines designated by reference number 40 represent the expansion boundary of the jetstream discharged from nozzle 14 when shield 20 is retracted to its forward position on housing 10. When the shield is deployed as illustrated in the last-mentioned drawing the lower half of the jetstream is confined within the wall of the shield, and sound waves emanating from this confined portion of said stream are reflected upwardly. The extent to which a shield of the type disclosed protects persons on the ground from noise of a jet stream has been found to depend upon various factors, including the length of the shield and the angle at which it is tilted upward into the jet stream.

The mounting of vanes 38A, 38B inside shield 20 provides an important advantage not obtained when vanes are mounted outside a shield of the same type as disclosed in the prior Millman et al. application, namely, the advantage of enabling the position of the shield to be more readily controlled by adjustments in the altitude of the vanes in the jetstream flowing thereby. When an aircraft is taking off from an airfield the relative velocity of slipstream air flowing past vanes which project laterally from the outer surface of a hemicylindrical shield, as disclosed in the earlier application, is less than optimum for controlling the position of the shield relative to the high velocity exhaust gas flowing therealong. However, with the vanes disposed inside a shield as disclosed herein the high-velocity jetstream itself exerts lifting force on the vanes and a slight variation in the attitude of the latter effective changes the angular position of the shield relative to the longitudinal axis of the jetstream.

It should be noted that a slot 42 is formed on each side of housing 10 and extends forwardly from the aft end thereof to receive a respective one of the vanes 38A, 38B when shield 20 is retracted to its stowed position. In other embodiments of the invention the vanes may be arranged to fold against the inner surface of the shield so as to eliminate the necessity for slots 42 in the engine housing. Various additional modifications can obviously be made in the disclosed apparatus without departing from the basic principles of the invention. Hence the scope of the invention should be considered to be limited only by the terms of the claims appended hereto.

We claim:

1. Sound suppressing apparatus for use with an aircraft, comprising: a housing surrounding a jet engine having a rearwardly discharging thrust nozzle; support means carried by said housing and movable axially thereof; an elongate noise reflecting and suppressing shield pivotally connected adjacent its forward end to said support means for swinging about a generally horizontal axis transverse to the longitudinal axis of said nozzle, said shield extending downstream from said housing with its forward end disposed in the vicinity of the lowermost portion of the exit of said nozzle when said support means is positioned at the aft portion of said housing; and at least one vane mounted inside said shield, whereby when said shield is in said downstream position the exhaust gas stream discharged from said engine exerts aerodynamic lifting force upon said vane to thereby swing said shield to a selected angular position relative to the longitudinal axis of said nozzle.

2. Apparatus as defined in claim 1 wherein said vane is presettable to cause said shield to move to a desired angular position relative to the longitudinal axis of said nozzle when said aircraft is in flight.

3. Apparatus as defined in claim 1 including: sensing means carried by said shield to sense the operating relation between said shield and said exhaust gas stream; and control means responsive to indications given by said sensing means to vary the attitude of said vane relative to said shield and thereby cause said shield to swing about said transverse axis until its optimum angular position relative to the longitudinal axis of said nozzle is attained.

4. Apparatus ad defined in claim 1 wherein said shield is substantially hemicylindrical in form and a vane is mounted adjacent each longitudinal edge thereof.